United States Patent
Johnson

(10) Patent No.: US 11,812,233 B2
(45) Date of Patent: Nov. 7, 2023

(54) VEHICLE AUDIO COMMUNICATION SYSTEM

(71) Applicant: Buddy Johnson, Mesquite, TX (US)

(72) Inventor: Buddy Johnson, Mesquite, TX (US)

( * ) Notice: Subject to any disclaimer, the term of this patent is extended or adjusted under 35 U.S.C. 154(b) by 139 days.

(21) Appl. No.: 17/553,288

(22) Filed: Dec. 16, 2021

(65) Prior Publication Data
US 2022/0191613 A1 Jun. 16, 2022

Related U.S. Application Data

(60) Provisional application No. 63/126,140, filed on Dec. 16, 2020.

(51) Int. Cl.
| | |
|---|---|
| *H04R 3/00* | (2006.01) |
| *B60Q 5/00* | (2006.01) |
| *B60R 11/02* | (2006.01) |
| *B60R 11/00* | (2006.01) |

(52) U.S. Cl.
CPC ............... *H04R 3/00* (2013.01); *B60Q 5/00* (2013.01); *B60R 11/0217* (2013.01); *B60R 11/0247* (2013.01); *B60R 2011/004* (2013.01); *B60R 2011/0057* (2013.01); *B60R 2011/0078* (2013.01); *H04R 2420/07* (2013.01)

(58) Field of Classification Search
CPC . B60R 11/02; B60R 11/0217; B60R 11/0247; B60R 2011/004; B60R 2011/0057; B60R 2011/0078; H04R 1/04; H04R 2201/028; H04R 2420/07; H04R 2499/13; H04R 3/00
USPC ................................................ 381/56–58, 86
See application file for complete search history.

(56) References Cited

U.S. PATENT DOCUMENTS

| | | | |
|---|---|---|---|
| 6,409,250 B1 * | 6/2002 | Schultheiss | B60H 1/248 296/146.7 |
| 6,857,688 B2 * | 2/2005 | Morrison | B60J 5/0416 296/146.7 |
| 8,776,438 B2 * | 7/2014 | Pleiss | E05F 11/382 49/502 |
| 2001/0012369 A1 * | 8/2001 | Marquiss | H04R 5/02 381/86 |
| 2011/0074958 A1 * | 3/2011 | Pastrick | B60R 1/006 348/148 |
| 2022/0386040 A1 * | 12/2022 | Preisler | B60R 13/025 |

\* cited by examiner

*Primary Examiner* — Lun-See Lao
(74) *Attorney, Agent, or Firm* — Donn K. Harms

(57) ABSTRACT

A communication system for vehicles allowing occupants of an interior cab of the vehicle to orally communicate with persons outside the vehicle while all windows and doors of the vehicle are closed. The system employs an internal communications component in operative communication with an exterior communications component to communicate voice communications to and from both the person outside the vehicle and the occupants of the sealed interior cab of the vehicle.

9 Claims, 3 Drawing Sheets

VEHICLE AUDIO COMMUNICATION SYSTEM

This application claims priority to U.S. Provisional Patent Application Ser. No. 63/126,140 filed on Dec. 16, 2020, which is incorporated herein in its entirety by this reference thereto.

BACKGROUND OF THE INVENTION

1. Field of the Invention

The invention herein disclosed relates generally to audio commendations from vehicles such as passenger cars and trucks. More particularly, it relates to an exterior-positioned audio broadcaster and receiver allowing an occupant of the vehicle to audibly communicate with a person outside the vehicle while keeping the cabin windows closed.

2. Prior Art

Background of the Invention

With the proliferation of motor vehicles, such as cars and trucks, in the U.S. and other countries came a concurrent rise of vendors, such as restaurants, fuel filling stations, banks, and other establishments, which found a manner to cater sales of products and services to occupants of such vehicles. Modernly, such vendors have evolved to provide drive-up and drive-through service for vehicle occupants, where product and service orders are orally communicated between the vehicle occupant and their vendor of choice.

While, more recently, computer applications have allowed for text input and communication for such products and services, the vast majority of such sales to vehicle occupants remain the drive-through model. In the provision of such drive-through sales and services, the vehicle occupant or occupants communicate by voice to either a customer service assistant or clerk directly or via a remote microphone. For example, drive through restaurants position food menus outdoors in a vehicle lane, and the vehicle occupants orally communicate their chosen food order to a clerk. The clerk may be at a window and speak directly to the vehicle occupants, or the sales clerk, in many instances, may be remote to the ordering station. The same procedures for sale and service are provided at banks, pharmacies, grocery stores and any number of businesses which provide drive-up sales and service to clients.

In either mode of operation, conventionally, the driver of the vehicle must lower their door window of the vehicle and speak either directly to the sales clerk, or they must lower their window and communicate to a microphone located at the ordering or customer service station. Subsequently, secondary oral communications conventionally occur between the vehicle driver and the customer service provider or sales clerk for the vendor. This oral communication may also occur between a vehicle driver and a cashier, teller, service assistant or the driver and another person tendering the food, products, groceries, bank services, or the like, to complete an order or visit.

While such drive-through sales systems have evolved to work well for any number of businesses and types thereof, there are occasions where keeping the windows raised on the vehicle may be more preferable. During rainstorms or during very cold weather, lowering the vehicle window to communicate orally with the customer service person or sales clerk for a product or service vendor can be uncomfortable at best, and can cause the driver to become wet with rain or snow. Further, where significant illness may be present in a community, the lowering of the window of the vehicle within speaking distance to the customer service person for a service or product vendor, to speak with them, can easily become a means of transmission of the illness between the driver and the representative of the product or service vendor.

With respect to the above, before explaining at least one preferred embodiment of the vehicle audio communication system it is to be understood that the disclosed device and system are not limited in application to the details of employment and to the arrangement of the components or the steps set forth in the following description or illustrated in the drawings. The various apparatus and operations of the herein disclosed vehicle audio communication system herein are capable of other embodiments, and of being practiced and carried out in various ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based, may readily be utilized as a basis for other vehicle audio communication systems which are removably mounted upon vehicles such as cars and trucks. It is important, therefore, that the embodiments, objects and claims herein, be regarded as including such equivalent construction and methodology insofar as they do not depart from the spirit and scope of the present invention.

SUMMARY OF THE INVENTION

The disclosed device herein provides an easily employed two-way audio communication system for vehicles such as cars and pickup trucks and the like. The device and method herein provides a system which allows the vehicle driver and occupants thereof to communicate with a customer service representative or sales associate of a business providing drive-through service. Using the device and system herein, such oral communication is easily accomplished while concurrently maintaining all the windows of the vehicle in a sealed or closed positioning.

To provide such communication between the driver and vendor with the vehicle windows in the up or sealed position, the system herein includes a two-way communication component which is configured for removable engagement to the exterior of a vehicle. The device in such a removable positioning can be engaged, for example, on the exterior rooftop or windshield of the vehicle. Preferably, this exterior communication component is somewhat stealth in appearance, to thereby minimize the potential for theft when the vehicle is not occupied, but the exterior communication component is still removably engaged.

The external communication component is engaged to the vehicle using a disengageable fastener operatively positioned on a contact surface which will be positioned on or immediately adjacent the surface of the vehicle. A preferred disengageable connector to be employed, where the external communication component is to be positioned on a ferrous metal surface, is a magnet operatively positioned on the external communication component. Because many modern vehicles have some non magnetically attractive portions for the body of the vehicle, such as those formed by aluminum, fiberglass, and resin composite materials, another preferred disengageable connector is one or a plurality of suction cups to removably hold the exterior communication component to the exterior surface of the vehicle. Additionally, the device may be removably engaged to a window surface using clips engaging on the edge of a window which rolls up or adhesive which holds a mount onto glass or non ferrous surfaces.

Particularly preferred, because of the superior biased engagement of padding on the lower surface of the housing with the surface of a vehicle, is the employment of magnets as connectors to hold the housing or a mount engaged to the housing on the vehicle. It was found, unexpectedly, that by positioning the magnets within apertures formed into the padding, which is adhered to the bottom of the housing or a mount holding the housing and recessing the magnets therein to form a gap, that the magnetic attraction toward the vehicle caused a biasing or compression of the pliable padding and a compressive engagement of the surface of the padding against the surface of the vehicle. Using open or preferably closed cell foam formed of neoprene or rubber or other polymeric material between ⅙ to inch in thickness, which has a durometer that compresses substantially 10 to 40 percent, a biased contact of the padding against the vehicle was formed which was found not to be present where the magnets were not recessed by the gap and actually contacted the vehicle. A padding having a durometer of 10-50 Shore A worked well. However, any compressible padding material, which will compress under the pull of the magnets chosen a distance which does not eliminate the gap, as would occur to those skilled in the art, is anticipated within the scope of this patent.

The recessed positioning of magnets such as Neodymium disk magnets within apertures in the padding is preferred for a substantially better engagement to a vehicle that resists sliding. The magnets should be of a strength where they have a pull force of at least one pound and preferably three pounds or more so that a plurality of such magnets will compress the padding and form the biased engagement. By pull force is meant that it takes one pound of force to disconnect the magnet from a steel or other ferrous metal plate.

The padding used will be of a durometer, as noted, that will compress between 10 to 40 percent of the thickness thereof under the pull force of the employed magnets. However, padding can vary so the distance of the gap in the uncompressed state should be determined such that the compression of the padding forming the biased engagement of the padding, which is caused by the pull force of the magnets, is such that a small gap remains once the mount is magnetically attached. Thus, the pull force of the magnets will be less than the force required to totally collapse the gap of the chosen durometer padding entirely, and the gaps will remain between the distal surface of the magnet and the surface of the vehicle.

The exterior communication component is formed of a housing which has an interior cavity which preferably surrounds and provides protection to the operating electronic components of the device therein. Operatively positioned on this housing are an exterior microphone and exterior loudspeaker. This exterior microphone is directly in communication with the exterior area surrounding the housing, as is the exterior loudspeaker. By directly in communication is meant that sound generated by the exterior loudspeaker may be heard by persons proximate to the exterior of the vehicle and that the exterior microphone will pick up the voice of such persons proximate to the exterior of the vehicle.

Preferably, the exterior microphone will be located on the housing of the external communication component in a position configured to face the people such as customer sales assistants, tellers, clerks, and other persons manning a drive through vending area for a vendor with whom the driver of the vehicle will communicate. The same positioning is preferred for the exterior microphone so as to more clearly capture the voice and oral communications from such persons exterior to the vehicle during a transaction.

Operatively engaged to the exterior microphone and exterior loudspeaker will be an external wireless transceiver powered by an onboard power supply, such as a battery. An antenna thereof is configured to broadcast wireless electronic signals at the chosen RF frequency and is operatively connected to the exterior transceiver. By operatively engaged is meant that electronic signals, from the exterior microphone generated by a voice of a sales or service person located exterior to the vehicle, are electronically communicated to the exterior transceiver which retransmits them to an interior transceiver of the interior communications component where the voice is broadcast to the interior of the vehicle by the interior loudspeaker engaged to the interior transceiver.

By operatively engaged, with respect to the exterior located loudspeaker, is meant that it is in electronic communication with the exterior transceiver either directly or through engaged electronic components such that the exterior loudspeaker will broadcast the voice of a user, located within the interior cabin of the vehicle, who is talking into the interior microphone engaged to the interior transceiver, which is wirelessly transmitting the voice of the user to the exterior transceiver and on to the exterior loudspeaker. Thus, a clerk or sales associate or the like located exterior to the vehicle will hear the voice of the user from the exterior loudspeaker, and the user within the interior cabin will hear the voice of the clerk or sales associate from the interior loudspeaker.

The same operative communication is meant by the operation of the interior communication component wherein an interior microphone is operatively engaged to the interior transceiver to thereby transmit the voice of a user located within the vehicle cabin, to the exterior transceiver and on to the exterior loudspeaker where the sales associate located adjacent the exterior of the vehicle can hear the voice of the user sealed within the interior cabin.

In use, the exterior loudspeaker positioned on the housing of the exterior communication component will communicate the voice from the user located within the interior cabin of the vehicle, which is broadcast to the exterior transceiver. The exterior loudspeaker, thus, will communicate the voice of the user talking within the vehicle to the customer service person for the vendor providing drive-through services adjacent the exterior of the vehicle.

Oral responses from the customer service person of the vendor, which are communicated outside the vehicle to the exterior microphone, will be broadcast into the interior cabin of the vehicle by the exterior transceiver wireless communication to the interior transceiver and on to the interior loudspeaker.

An internal communication component, such as a smartphone, the wireless communication system of the vehicle, or a hand held transceiver or the like will receive the wireless transmission from the exterior transceiver mounted on the exterior of the vehicle. The internal communication component will broadcast the oral communication from the vendor customer service person located outside the vehicle from the interior loudspeaker of the internal communication component to the driver or occupant of the vehicle cabin.

The internal communication component can be a specialized voice communication component configured for this task of two-way wireless communication, or it may be a smartphone using software running thereon to cause it to operate as the interior communication component. Alternatively, it may also be bluetooth or RF communication with the audio system provided on many modern vehicles which are configured to pair with a separate communication component in a conventional fashion.

In operation the internal communication component will, over a wireless transceiver component, broadcast and receive oral communications over a short range RF frequency such as Bluetooth. During operation, the internal communication component is "paired" with the exterior communication component using software adapted to that task of identifying the external communication component and then pairing the internal communication component with the specifically identified external communication component using an electronic identifier. Such an identifier, for example, can be the Mac ID of the wireless transmitter on both the internal and exterior communications components which are identified and associated in a paired match. This paired match is held in electronic memory of both the internal and exterior communication components, and both will thereafter only communicate with each other.

The external component is activated to an energized mode in a conventional fashion such as with an on-off switch. Optionally, to deter theft, the external communication component can be fitted with a proximity switch, such as a magnet or a mechanically activated switch, which is activated by removal of the exterior component from the vehicle. Using software running in electronic memory engaged with a microprocessor of the external communication component, when signaled, this proximity switch is activated, the locking software will use the previous match of the electronic identifier, such as the Mac ID of the paired internal communication component, and it will be fixed into electronic memory. This renders the external communication component useless except for direct communications with the previously paired internal communication component, thereby deterring theft once this limitation is known.

In operation, when the driver moves to a point in a drive-through purchase or service, where voice communication is required, the driver will speak into the internal microphone of the internal communication component. Using the onboard wireless communications, the internal communication component will wirelessly transmit the words of the driver to the wireless transceiver of the external communication component. The external loudspeaker thereon will communicate the spoken words of the vehicle occupant to the sales clerk or to a microphone in communication with the sales clerk.

Also, during operation of the device and system, oral communication and responses from the sales clerk or business service associate will be captured by the onboard exterior microphone of the external communication component. The oral communications captured by that external microphone will be electronically communicated to the exterior wireless transceiver of the external communication component which will transmit the words in a wireless communication to the paired internal communication component. The internal loudspeaker of the internal communication component will transmit the words to the vehicle occupant.

As can be discerned, all oral communication, by and between the vehicle occupant and a customer service or sales associate of the vendor offering drive-through services, can occur without the need for the driver or a vehicle occupant to roll down a window of the vehicle. Thus, the internal cabin of the vehicle remains sealed from inclement weather, cold, and any potential hazardous communication of a pathogen between the vehicle occupants and the sales clerk on the exterior.

With respect to the above description, before explaining at least one preferred embodiment of the two-way audio communication system for vehicles herein, it is to be understood that the invention is not limited in its application to the details of operation nor the arrangement of the components or the steps set forth in the following description or illustrations in the drawings. The various methods of implementation and operation of the communication system herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other two-way audio communication system for vehicles, and for carrying out the several purposes of the disclosed communication system. Therefore, the objects and claims herein should be regarded as including such equivalent construction, steps, and methodology insofar as they do not depart from the spirit and scope of the present invention.

It is an object of this invention to provide an oral communication system between a customer service associate of a business having drive-through services who is outside a vehicle and the driver or occupants in the interior cabin of the vehicle, which allows the windows on the vehicle to remain closed thereby sealing the occupants of the vehicle from weather and potential pathogens exterior to the vehicle.

These, together with other objects and advantages which become subsequently apparent, reside in the details of the construction and operation of the vehicle communication system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURE

DETAILED DESCRIPTION OF THE PREFERRED EMBODIMENTS OF THE INVENTION

Figure 1:
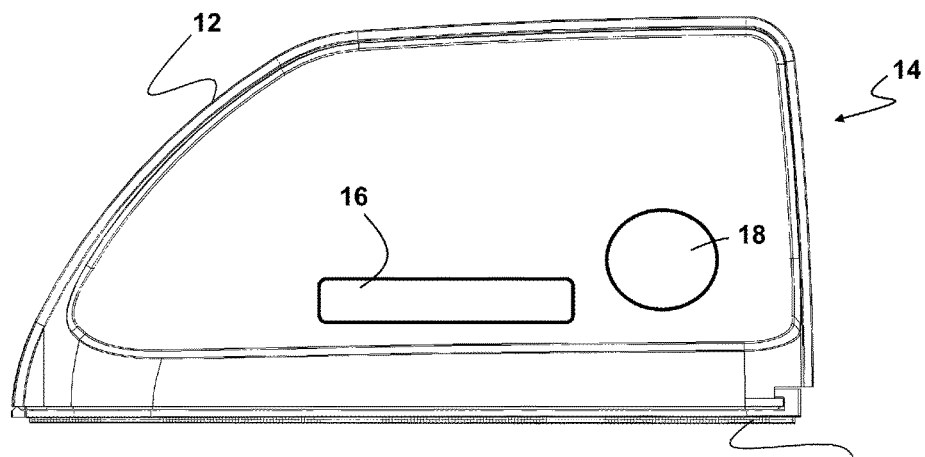
FIG. 1 depicts a side view of the housing of the external communication component showing a stealth shape thereof and showing a microphone and loudspeaker for communicating sound to and from the component.

Referring now to the system 10 herein, in the depictions of FIGS. 1-6, there is seen in FIG. 1 a side view of the substantially weatherproof housing of an external communication component 14. As shown, the housing 12 is formed in a stealth shape, such as that of a GPS conventional vehicle antenna and has an interior cavity for the electronic communication components.

Also shown, operatively engaged to the housing 12, are a microphone 16 and a loudspeaker 18 which are used for communicating audible sound to and from the external communication component 14 during use. Preferably, a contact surface or mating surface 20 which is the surface which attaches to the exterior surface of the vehicle 24 has padding 22 or a protective layer thereon.

Figure 2:
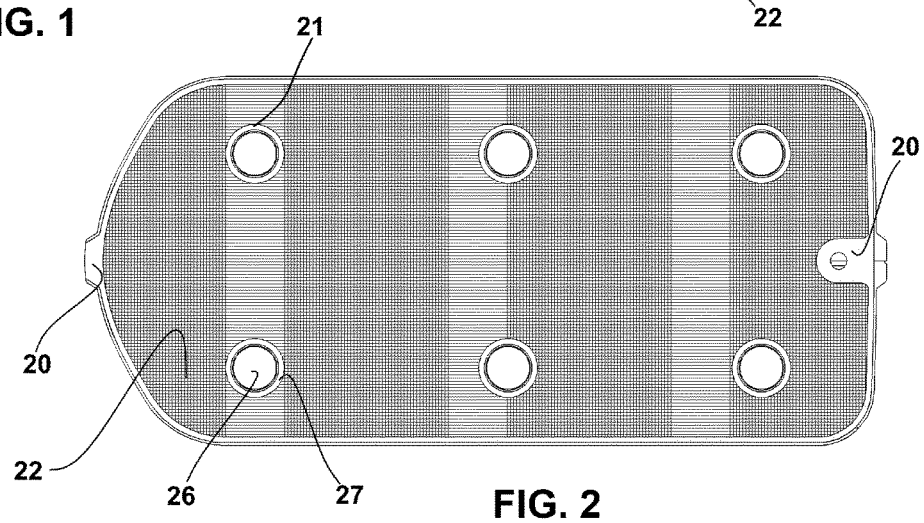
FIG. 2 depicts a padded mating surface of the external communication component and shows removably engageable fasteners, such as magnets, positioned to hold the housing to an external surface of the vehicle without contacting the vehicle with the magnets.
Figure 3:
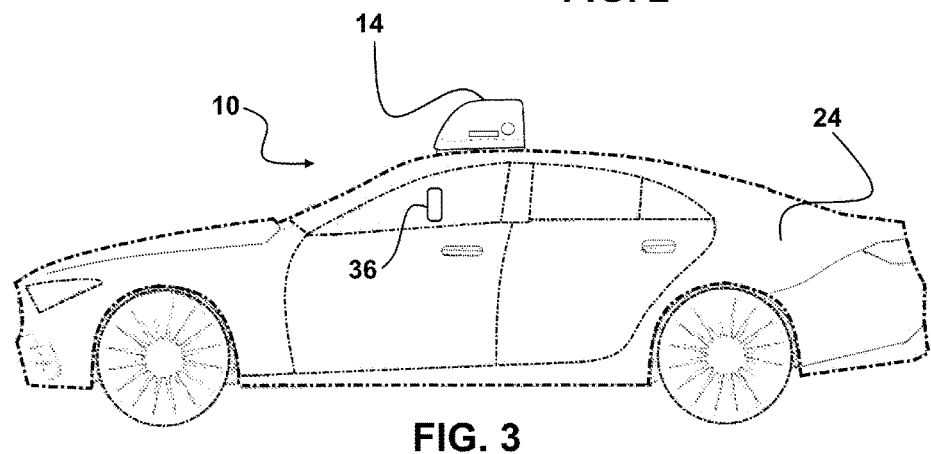
FIG. 3 depicts a typical operative positioning of the external communication component herein upon a vehicle.

Depicted in FIG. 2 is the noted mating surface 20 of the housing 12 and the preferred padding 22. Also shown are the connectors 26 which removably hold the housing 12 to a mounted position on the external surface of the vehicle 24, such as is shown in FIG. 3. Currently preferred connectors 26 include magnets and suction cups. Such a removable connection to a vehicle 24 is shown, for example, but in no way limiting, in FIG. 3, wherein the housing 12 is positioned on the roof of the vehicle 24.

Figure 4:
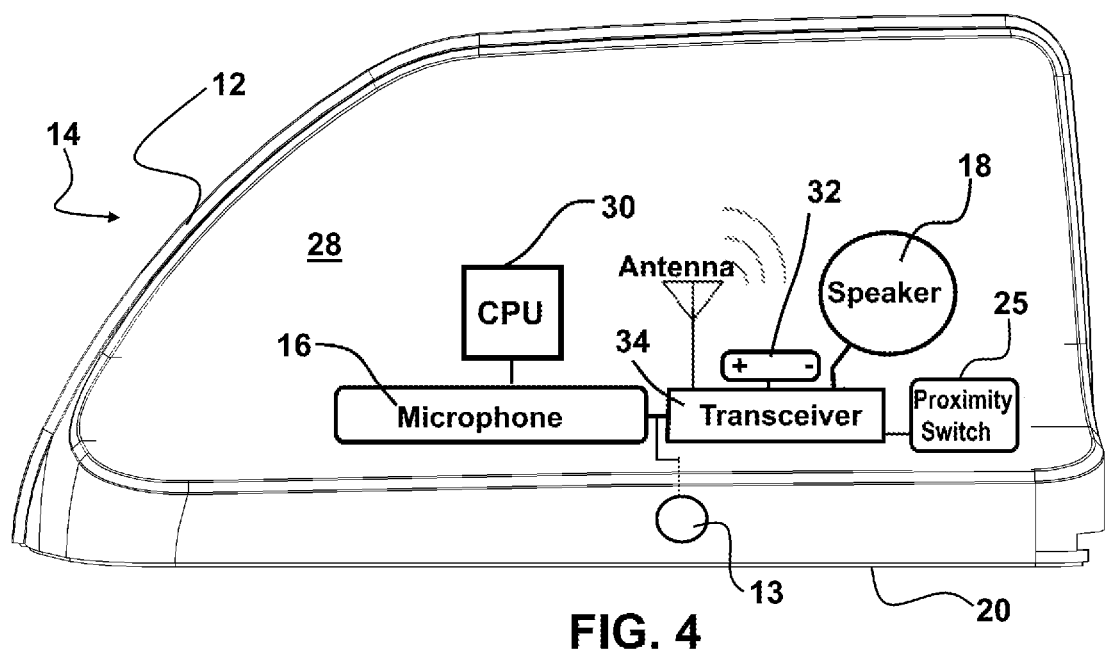
FIG. 4 depicts a view of the external communication component having a housing adapted for removable engagement to the exterior of a vehicle and shows a depiction of operative components positioned therein.

In FIG. 4 is shown a sectional view of the housing 12 showing an internal cavity 28 thereof which holds the electronic components of the external communication component 14. As shown, the microphone 16 and loudspeaker 18 provide for sound transmission of voices to and from the housing 12 during use. Also shown are an activation switch 13 which may be employed to energize the external communication component 14 to an operational state where it pairs with the internal communication component 36 (FIG. 5).

In operation, a microprocessor operatively connected to electronic memory, shown as a CPU 30, is operatively engaged with onboard electric power such as a battery 32. The microphone 16 converts sound to electronic signals which are communicated to one or both of the CPU and the wireless transceiver 34. The wireless transceiver 34, for example, may be a Bluetooth transmitter/receiver which is operatively connected to the CPU to transmit and receive sound to and from the exterior communication component 14.

Figure 5:
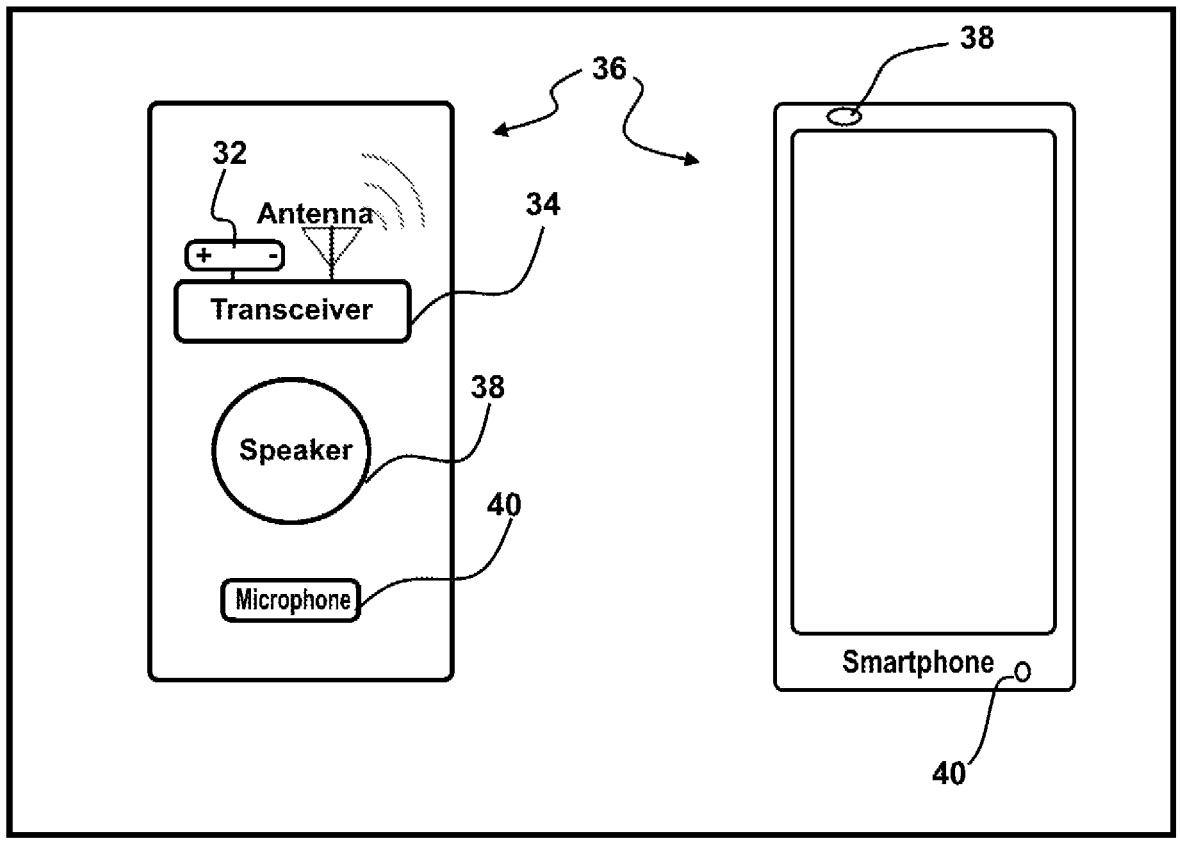
FIG. 5 shows modes of the internal communication component which is paired with and adapted for two-way communication with the external communication component of FIG. 1.

In use, sound picked up from the microphone 16 is processed and wirelessly transmitted to the internal communication component 36, such as those in FIG. 5, for broadcast by the secondary speaker 40 of the internal communication component 36. As is well known, smartphones have microphones and loudspeakers to enable them to operate as the internal communication component 36. However, such an internal communication component 36 might be provided for mounting within the cabin of the vehicle and would operate the same as that shown in FIG. 4.

Both the internal communication component 36 and the external communication component 14 employ software running in respective electronic memory and respective CPUs 30 (FIG. 4 but also well known to be in smartphones and hand-held transceivers) on each to operate in a cooperative manner. By operate in a cooperative manner is meant that the voice of the cabin occupant is wirelessly transmitted to the loudspeaker 18 of the external communication component 14, and the voice of the sales associate outside the vehicle 24, captured by the microphone 16 on the housing 12, is wirelessly communicated back to the secondary or interior loudspeaker 38 of the internal communication component 14.

As can be discerned, with the system 10 herein operatively positioned on a vehicle 24, the driver and occupants of the cabin of a vehicle 24 can communicate with a sales associate of a vendor offering drive up service outside the vehicle 24. Back and forth oral communications can be accomplished without rolling down any windows. The vehicle 24 occupants are thereby kept safe from rain, snow, and potential exposure to airborne pathogens outside the cabin of the vehicle 24.

Optionally, to deter theft, the external communication component 14 can be fitted with a proximity switch 25, such as a magnetic sensor which senses a loss of magnetic attraction to the vehicle 24 or a magnet 27 on a mount 15, or a mechanically activated switch, such as a projecting spring loaded button, which is activated by removal of the exterior component from the vehicle. Using software running in electronic memory, engaged with the CPU 30, upon receiving a signal from the proximity switch 25, the external communications component 14 can be locked in its previous pairing to only communicate with the previously paired internal communications component 36 thereby deterring theft by rendering the external communications component 14 useless without the previously paired internal communications component 36.

Figure 6:
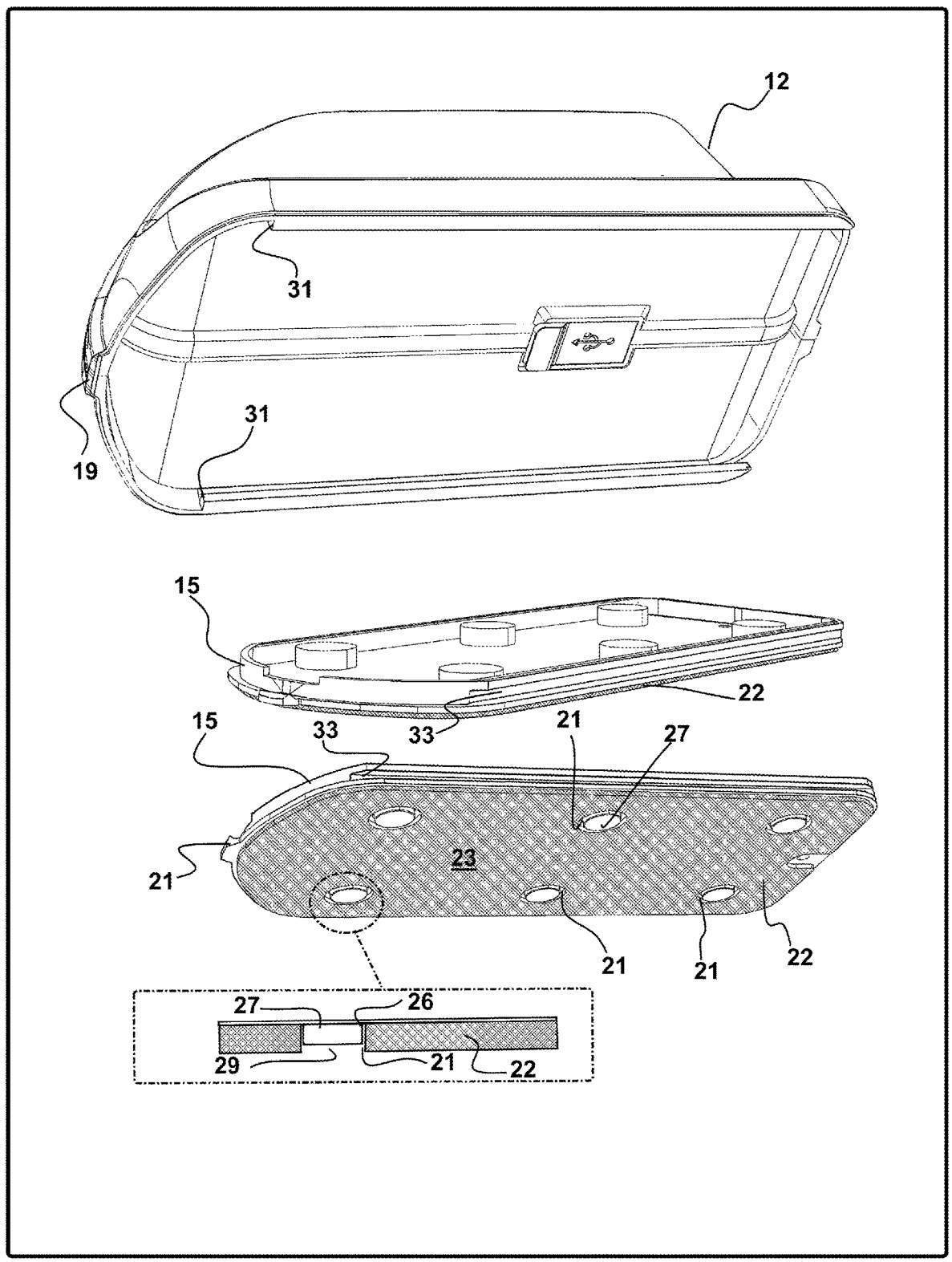
FIG. 6 depicts views of another mode of the device having a housing and internal components, as with FIGS. 1-2 and 4, but having a secondary housing which is configured for positioning on a vehicle and which will removably engage with the housing so as to allow for removal of the housing from the vehicle-engaged secondary housing.

Shown in FIG. 6 are multiple views of a mode of the system 10 herein which operates in the same fashion as that described in FIGS. 1-5. The components of the system in FIG. 6 include the exterior communication component 14 which includes a housing 12 and internal electronic components and functions as with FIGS. 1-2 and 4.

Also shown in FIG. 6 is a mount 15 which is configured for positioning on a vehicle 24 in a removable engagement therewith, such as with connectors 26 in the form of magnets 27 which are recessed into apertures 21 formed into the padding 22. In this mode of the system, the housing 12 removably engages with the mount 15 so as to allow for removal of the housing 12 from the vehicle-engaged mount 15.

Currently preferred, ribs 31 on the housing 12 are positioned to slidably engage with slots 33 formed into the mount 15. A lock is formed once the housing 14 is slidably engaged upon the mount 15 by a recess 19 in a front end of the housing 12 into which a lock member 21 engages. The lock member 21 is flexible and may be disengaged by overcoming the bias thereof into the recess 19 and sliding the housing 12 off of its engagement to the mount 15.

The mount 15, shown in FIG. 6, has a plurality of magnets 27 thereon which will magnetically hold the mount 15 to the vehicle 24. The magnets 27 are positioned in apertures 27 formed into the padding 22 and are engaged to the mount 15. Preferably, there is a gap 29 between the distal end of the magnets 27 and the contacting surface 23 of the padding 22.

In experimentation, it was found that leaving the gap 29 between the magnets 27 and the surface of the vehicle 20 on which the mount 15 is attached, yielded a more secure connection of the mount 15 than an engagement allowing the magnets 27 to touch the surface of the vehicle 24, which was unexpected. Leaving the gap 29, thus, prevented scratches to the surface of the vehicle 24 which were caused by a sliding of the mount 15 when the magnets 27 were extended to be even with the contact surface 23 of the padding 22 and contacted the vehicle 24 surface.

Where strong magnets 27 are employed with very high magnetic attraction, such as Neodymium magnets, it was found that the resistance to sliding of the mount 15 on the vehicle 24 increased, which was also unexpected. However, by leaving the gap, 29 it was found that the pliable padding 22 such as rubber or nylon or other polymeric material, having a durometer that is slightly compressed by the pull force of the magnets 27, formed a compressed or biased engagement of the contact surface 23 of the padding 22 against the surface of the vehicle 24. In some cases it also appeared that a suctioned engagement of the apertures 21 in the padding 22 surrounding the magnets 27 was formed by the compression of the padding 22 material.

Finally, while the recessed positioning of the magnets 27 within apertures 21 formed in the padding 22 is shown in the mode of the device 10 employing a mount 15, the recessed positioning within an aperture 21 and the formed gap 29 can also be employed with magnets 27 of the appropriate pull strength which are connected to the bottom of the housing 12 alone as shown in FIGS. 1-5.

While all of the fundamental characteristics and features of the disclosed vehicle audio communication system, have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions as would occur to those skilled in the art, are considered as included within the scope of the invention as defined by the following claims.

What is claimed is:

1. A communication system for vehicles, comprising:
an exterior communication component having a housing surrounding an interior cavity;
a connector positioned on a bottom of said housing, said connector configured to form a removable engagement with an exterior surface of a vehicle;
an exterior microphone engaged with said housing;
an exterior loudspeaker engaged with said housing;
said exterior microphone operatively engaged with an external transceiver positioned within said interior cavity;
said exterior loudspeaker operatively engaged with said external transceiver;
an interior communication component located within an interior cabin of the vehicle;
said interior communication component having an interior transceiver in a wireless communication with said exterior transceiver;
said interior communication component having an interior loudspeaker in operative communication with said interior transceiver;
said interior loudspeaker reproducing a voice of a person from a position adjacent said exterior surface of said vehicle which is received by said exterior microphone and is wirelessly communicated from said exterior transceiver to said interior transceiver, into said interior cabin;
said interior communication component having an interior microphone for receiving a voice of a user positioned within said interior cabin, said interior microphone operatively engaged with said interior transceiver;
said exterior loudspeaker broadcasting said voice of said user captured by said interior microphone to said position adjacent said exterior of said vehicle; and
whereby said user and said person can communicate orally with said user being positioned within said interior cabin of said vehicle with doors and windows of said vehicle being closed.

2. The communication system for vehicles of claim 1, additionally comprising:
padding material having a first side engaged with said bottom of said housing and having a second side for contact with said exterior surface of said vehicle; and
said padding forming a soft contact of said second side against said exterior surface of said vehicle for preventing scratches to said exterior surface.

3. The communication system for vehicles of claim 1, additionally comprising:
said connector comprising one or a plurality of magnets, each said magnet forming a magnetic attraction between said housing and said exterior surface of said vehicle.

4. The communication system for vehicles of claim 2, additionally comprising:
said connector comprising one or a plurality of magnets, each said magnet forming a magnetic attraction between said housing and said exterior surface of said vehicle.

5. The communication system for vehicles of claim 3, additionally comprising:
a base, said base having a first side configured for a removable connection with said bottom of said housing;
said base having a second side;
padding material having a first side engaged with said second side of said base;
said padding having a second side for contact with said exterior surface of said vehicle; and
said magnetic attraction biasing said padding material in a direction toward said exterior surface of said vehicle thereby forming a biased contact of said second side of said padding against said exterior surface of said vehicle.

6. The communication system for vehicles of claim 1, additionally comprising:
a base, said base having a first side configured for a removable connection with said bottom of said housing;
said base having a second side;
padding material having a first side engaged with said second side of said base;
said padding material having a second side for contact with said exterior surface of said vehicle;

apertures formed into said padding material, said apertures defining recesses formed into said padding material, said recesses extending from said second side of said base to said second side of said padding;

a magnet positioned within said recesses, each said magnet extending from a first side surface thereof engaged with said second side of said base, to a second side surface thereof;

each said magnet forming a respective magnetic attraction between said base and said exterior surface of said vehicle; and a gap between each said second side surface of each said magnets located in each respective recess and said second side of said padding material.

7. The communication system for vehicles of claim 5, additionally comprising:

said magnetic attraction biasing said padding material in a direction toward said exterior surface of said vehicle thereby forming a biased contact of said second side of said padding against said exterior surface of said vehicle; and said gap maintaining said second side surface of each respective magnet separated from a contact against said exterior surface of said vehicle.

8. The communication system for vehicles of claim 6, wherein said removable engagement of said first side of said base with said bottom of said housing comprises:

a pair of ribs positioned upon said housing which are slidably engageable with a pair of slots formed into opposing sides of said base.

9. The communication system for vehicles of claim 7, wherein said removable engagement of said first side of said base with said bottom of said housing comprises:

a pair of ribs positioned upon said housing which are slidable engageable with a pair of slots formed into opposing sides of said base.

* * * * *